United States Patent [19]
Phaal

[11] 4,008,055
[45] Feb. 15, 1977

[54] ABRASIVE WHEEL CONTAINING NICKEL COATED NEEDLE-SHAPED CUBIC BORON NITRIDE PARTICLES

[76] Inventor: Cornelius Phaal, Robant Lane, Edenburg, Rivonia, Sandton, Transvaal, South Africa

[22] Filed: Feb. 28, 1975

[21] Appl. No.: 554,121

[30] Foreign Application Priority Data

Mar. 7, 1974 South Africa .................. 74/1474

[52] U.S. Cl. .................. 51/298 R; 51/295; 51/307
[51] Int. Cl.² .................. B24D 3/28
[58] Field of Search ............ 51/298, 307, 308, 309, 51/295

[56] References Cited

UNITED STATES PATENTS

| 2,545,676 | 3/1951 | Small | 51/309 |
| 3,495,960 | 2/1970 | Schladitz | 51/298 |
| 3,619,152 | 11/1971 | Yalof | 51/298 |
| 3,868,232 | 2/1975 | Sioui | 51/298 |
| 3,918,218 | 11/1975 | Zoiss | 51/298 |

Primary Examiner—Donald J. Arnold
Attorney, Agent, or Firm—Cushman, Darby & Cushman

[57] ABSTRACT

This invention provides an abrasive product, which can be for use in or form part of an abrasive tool, comprising a bonding matrix, preferably resin, containing needle-shaped cubic boron nitride particles so aligned that their long axes are substantially normal to the working face of the product.

1 Claim, 1 Drawing Figure

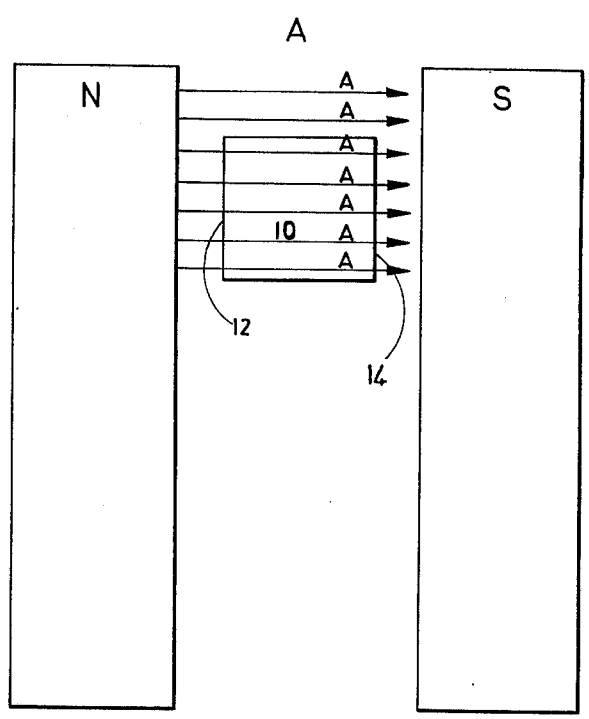

ABRASIVE WHEEL CONTAINING NICKEL COATED NEEDLE-SHAPED CUBIC BORON NITRIDE PARTICLES

This invention relates to abrasive products and, particularly to such products which contain cubic boron nitride as the abrasive particle.

Abrasive products consisting of abrasive particles held in a bonding matrix are extensively used in industry. The abrasive products in general form part of tools such as grinding wheels, cutting tools, drills and so on. A variety of abrasive particle may be used such as diamond, cubic boron nitride, alumina, and silicon nitride. The type of abrasive particle which is selected depends to a large extent on the nature of abrading operation and the type of material being abraded. The bonding matrix will vary according to the tool of which the product forms a part and may be metal, resin, vitreous or rubber.

As mentioned above, one of the abrasive particles which is used in such products is cubic boron nitride. Cubic boron nitride is a synthetic material which is made by subjecting hexagonal boron nitride to conditions of elevated temperature and pressure, e.g. pressures of the order of 55 kilobars and temperatures of the order of 1500° C, in the presence of a suitable catalyst. The basic patent covering the production of cubic boron nitride is U.S. Pat. No. 2,947,617.

In the production of cubic boron nitride, some of the particles produced are needle or columnar-shaped, i.e. they have a long axis and a short axis substantially transverse to the long axis. It is an object of the present invention to put such particles to good effect.

According to the invention, there is provided an abrasive product having a working face and comprising a bonding matrix containing needle shaped cubic boron nitride particles, a substantial portion of the particles being so aligned that their long axes are substantially normal to the working face. As mentioned above needle shaped cubic boron nitride particles are those cubic boron nitride particles including particles known in the art as "flats" which have a long axis and a short axis transverse to the long axis. The ratio of long axis to short axis is preferably at least 3:1. When the long and short axes are not uniquely defined, one takes the long and short axes of greatest dimension to determine this ratio.

The abrasive product may also contain some cubic boron nitride particles which are not of needle shape. It is preferable however, to have as much as possible of the cubic boron nitride of the needle shape and as much as possible of the needle shaped material aligned in the manner described above.

The abrasive product may be a segment for a grinding wheel or may be the operative grinding portion, i.e. the rim, of a grinding wheel. Grinding wheels, particularly resin bond grinding wheels, consist of a hub portion and operative grinding portion or rim around the hub portion.

The bonding matrix may be any known in the art. It is preferred however, that the matrix is a resin matrix such as a phenolformaldehyde resin or a polyimide resin. In this case the abrasive product will be for use in, or form part of, a resin bond grinding wheel. Suitable resin matrices are well known in the art.

The abrasive particles are preferably metal coated, particularly when the matrix is a resin. Suitable coating metals are well known in the art. The preferred metal is nickel. The coating preferably comprises between 30 and 80 weight percent based on the coated particle.

Further according to the invention, a method of making an abrasive product of the type described above includes the steps of providing a mixture of needle shaped cubic boron nitride particles and starter ingredients for the bonding matrix, causing a substantial portion of the particles so to align that their long axes are substantially normal to the eventual working face of the product, and allowing the starter ingredients to set at least partially around the particles.

The particles may be aligned by means of any suitable impressed field of force. Thus, pressure or electrostatic forces may be used. The preferred method is, however, the use of an impressed magnetic field. In this case, the particles will be provided with a magnetic coating and the bonding matrix will be of a non-magnetic material. Resins are suitable non-magnetic bonding matrices and nickel, cobalt and iron, preferably nickel, are suitable magnetic coating materials for the particles.

When the bonding matrix is a resin, the resin is allowed to set by applying pressure and heat. In order to set the resin only partially, pressure along need be applied.

Needle shaped cubic boron nitride particles may be selected from a batch of cubic boron nitride particles by known tabling and sorting techniques.

When the impressed field of force is a magnetic field, a pair of strong magnetic poles can be used. The attached drawing illustrates schematically, by way of example, a method of magnetically orientating the particles. Referring to the drawing, there is shown a mould 10 of a suitable non-magnetic material such as stainless steel having permanent magnets of opposite poles on each of opposite sides 12, 14 thereof. A mixture of magnetic metal coated needle-shaped cubic boron nitride particles and the starter ingredients of a non-magnetic bonding matrix is poured into the mould. The particles on falling through the magnetic field tend to align in the direction of the magnetic lines of force, i.e. in the direction of arrows A. The force is maintained while the matrix is allowed to set. The particles are then aligned with their long axes transverse to the faces contacting sides 12, 14 of the mould. One of these faces will provide the working face of the product.

In an example of the invention, cubic boron nitride particles of particle size 60/80 U.S. mesh and containing about 80% needle shaped particles having a ratio of long axis to transverse short axis of at least 2:1 were provided with a 60 weight percent, based on the coated particle, nickel coating. The nickel coated particles were then mixed with powdered phenolformaldehyde resin starter ingredients and usual inorganic fillers such as silicon carbide. The quantities of the various components in the mixture was 12.5 volume percent cubic boron nitride, based on the uncoated particle, 25 volume percent resin starter ingredients and 62.5 volume percent filler.

The mixture was used for making a resin bond grinding wheel and in particular the rim thereof. The mould for this wheel was conventional in the sense that it was provided with a bakelite hub portion around which was a rim-defining groove portion. The mould was unconventional in the sense that it was made of stainless steel and was provided with a first permanent magnet inside the hub portion and a second permanent magnet, of opposite pole, outside the rim-defining groove. The arrangement was thus similar to that illustrated schematically in the drawing.

The mixture was poured into the rim-defining groove and in so doing passed through the magnetic field. The lines of magnetic force being radial, i.e. directed from the centre to the periphery of the mould, caused a substantial portion of the nickel-coated needle-shaped cubic boron nitride particles to align radially. In other words, the long axes of these aligned particles were substantially normal to the periphery of the rim portion which defines the working face of the wheel. The magnetic field was maintained while heat and pressure was applied to the mixture to cause the resin to set.

The G ratio of a number of wheels made in the above described manner and tested on M-2 high speed steel was determined and averaged. The average of six wheels was found to be 78. By way of comparison similar wheels were made using nickel coated cubic boron nitride which was not of needle shape. The average G ratio of six such wheels again tested on M-2 high speed steel was found to be 65.

We claim:

1. A grinding wheel comprising a hub portion and a peripheral grinding portion, the peripheral grinding portion comprising a resin matrix selected from phenolformaldehyde and polyimide resins containing nickel coated needle-shaped cubic boron nitride particles, each particle having a long axis and a transverse short axis, the nickel coating comprising from 30 to 80 weight percent of the coated particle and a substantial portion of the particles being so aligned that their long axes are substantially normal to the working face of the grinding portion.

* * * * *